Figure 1:
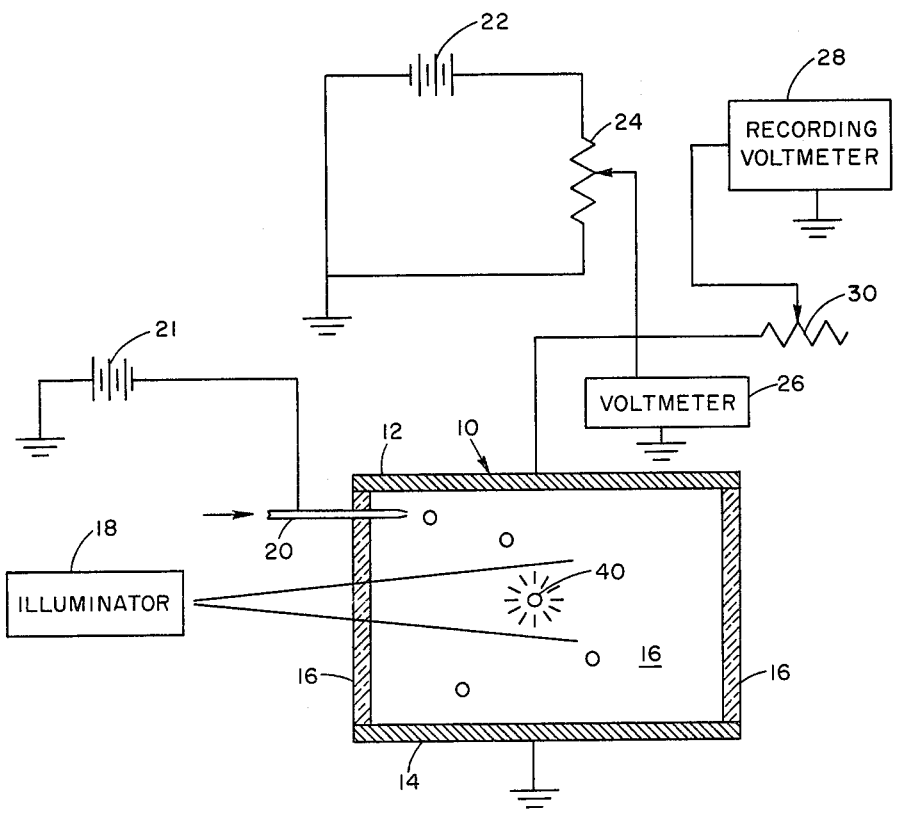

Arnold W. Doyle
David Read Moffett
Bernard Vonnegut
*INVENTORS*

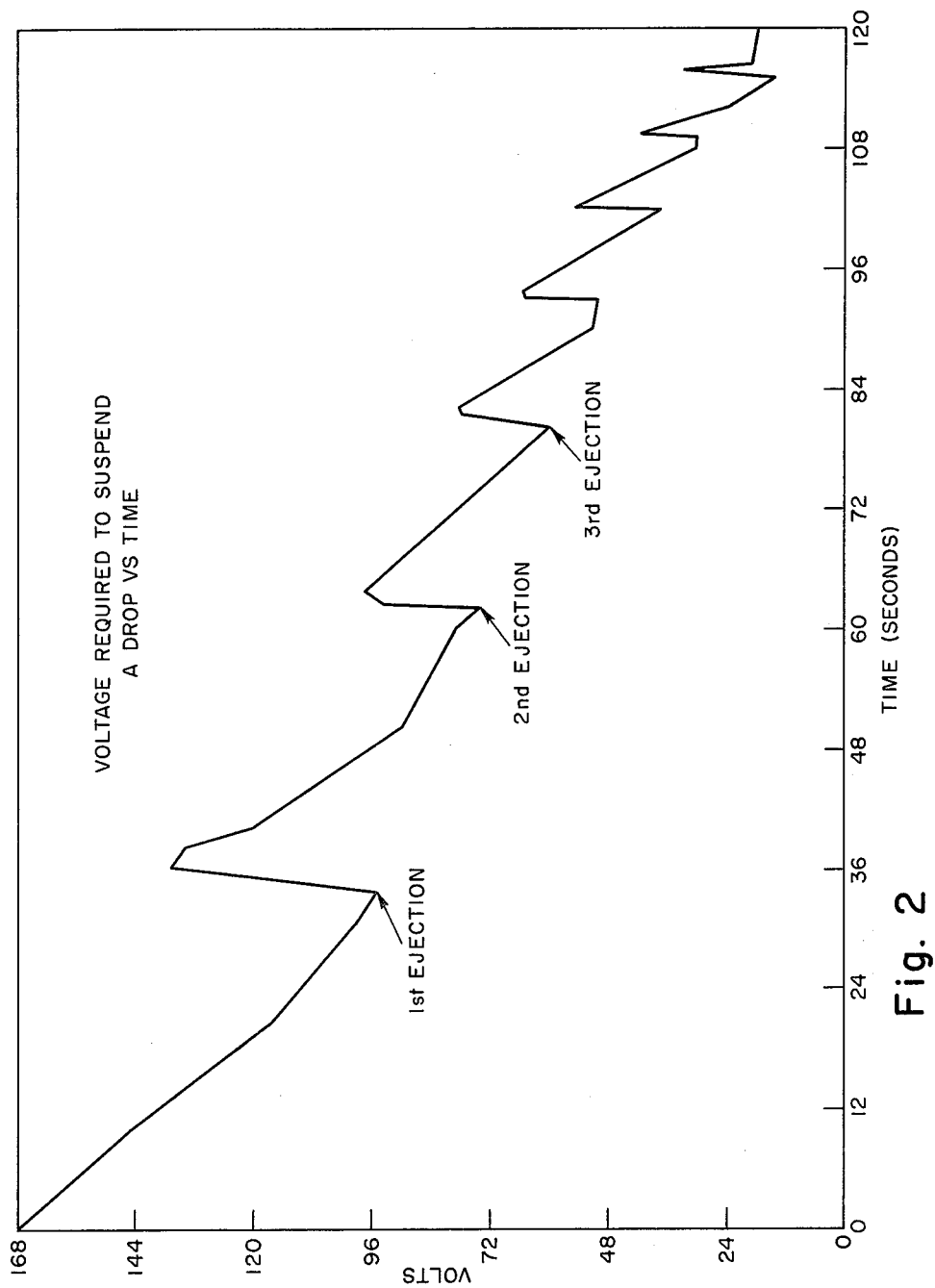
Fig. 2
INVENTORS
Arnold W. Doyle  David Read Moffett  Bernard Vonnegut
BY
Agent United States Patent Office 3,210,007
Patented Oct. 5, 1965

3,210,007
METHOD FOR PRODUCING PARTICLES OF
HIGH CHARGE DENSITY
Arnold W. Doyle, Watertown, David Read Moffett, Cambridge, and Bernard Vonnegut, Weston, Mass., assignors to Arthur D. Little, Inc., Cambridge, Mass., a corporation of Massachusetts
Filed Mar. 18, 1963, Ser. No. 265,967
4 Claims. (Cl. 239—3)

This invention relates to the production and handling of volatile aerosol particles having high charge density.

Extensive studies have been made of the properties and behavior of aerosols, not only for military purposes such as chemical agents and screening smokes, but for non-military purposes such as gas cleaning, air pollution control, meteorology, and a wide range of consumer products. However, these studies have been relatively little concerned with the electrical phenomena which are always involved to a greater or lesser degree in aerosol production, behavior and control.

Because the atmosphere in which aerosol particles are suspended is a good electrical insulator, these particles can carry electrical charges of either polarity for appreciable periods of time. The electrification of the particles can be sufficiently large that electrical forces acting on them can have a marked effect on their behavior.

When any chemical or bacteriological agents are used in the field and dispensed as an aerosol the effects that are desired arise as the result of the deposition of the aerosol particles on a surface. If the particles of the aerosol are given strong electrical charges it has been demonstrated that it is possible to increase the rate of deposition of the particles as the result of electrical forces.

If large quantities of unipolar charged aerosol particles are dispersed in the field they will produce large electric fields that will cause motion of the particles to all grounded objects. This increases the rate of deposition on desirable targets.

Conversely, electrostatic effects should be useful for reducing or preventing the deposition of aerosols. For example, if aerosol particles carry one polarity of charge it is possible to reduce their rate of deposition on an object by charging this object with the same sign of electricity. When this is done, the electrostatic forces repel the aerosol particles and prevent them from depositing.

In producing and handling aerosols having electrical characteristics useful for the foregoing, and other purposes, we have found that we can produce charged particles having charges far in excess of the maximum values hitherto attainable, by a process involving evaporation or volatilization of the electrified particles. The production of these highly charged particles is accompanied by the ejection of small electrified droplets or minute particles from the particles as they evaporate. By making use of this latter phenomenon it is possible to create an aerosol that continues to subdivide and thus produce many more particles after it has been released into the atmosphere.

The particles may be liquid or solid; they may be in the form of solutions or suspensions or may be single liquids or solids. The criterion is that they evaporate or volatilize at least in part, into the ambient medium into which they are introduced. This medium is consequently an atmosphere or gaseous fluid into which the particles can volatilize or evaporate.

The production of the highly charged aerosols of this invention will now be described in connection with the accompanying drawings, which are to be considered as illustrative and not limiting, and wherein FIG. 1 is a schematic view of one form of apparatus suitable for applying a high charge to aerosol particles, and FIG. 2 is a plot of voltage required to suspend an aerosol particle of selected diameter against time.

The apparatus shown in FIG. 1 comprises a closed chamber 10 having top and bottom parallel conductive plates 12 and 14, separated by insulating walls 16. These walls enclose the chamber, and at least one of them is preferably of glass or other transparent material so that a light source 18 may project a beam of light into the chamber. A small orifice 20 is provided in one of the walls to admit aerosol particles as desired. This orifice is maintained at high voltage, by any suitable means, e.g. from power source 21.

Bottom plate 14 is grounded. Voltage is applied to top plate 12 by a D.C. source 22, controlled through a potentiometer 24. A D.C. voltmeter 26 indicates the voltage across plates 12 and 14. A recording voltmeter 28 may be used to record the plate voltage as a function of time (see FIG. 2 for an illustrative run). A variable resistor 30 may be used to protect the recorder meter movement when the low voltage ranges are used.

As one illustrative example, the apparatus described above can be used as follows for observing the behavior of charged aerosol particles:

A cloud of about 20 charged droplets of liquid (or volatilizable solid) is injected into chamber 10 through a hypodermic needle or similar injecting device 20 maintained at about 5 kv. by D.C. power supply 21. These droplets are in the order of 200 microns in diameter. The field is illuminated by a 300 watt projector 18. The plates 12, 14 are of brass and are spaced apart a distance of 11 centimeters, and a voltage of a few hundred volts is applied across the plates, initially.

One droplet 40 of the cloud of charged droplets is selected by eye, and the voltage between plates 12 and 14 is adjusted so that the electric force on the droplet just balances the effect of gravity. In this condition the droplet remains suspended, and the evaporation of the droplet can be observed over extended periods of time. As the mass of the droplet 40 decreases, the electric field between the plates is reduced in order to maintain the electrical force at the point required to balance the gravitational effect.

The force balance is described by the equation $$mg = qE = q\frac{V}{d} \qquad (1)$$

wherein $m$ = mass of droplet in kilograms
$g$ = acceleration of gravity in meters/sec.$^2$
$q$ = charge on droplet in coulombs
$E$ = electric field between the plates in volts/meter
$V$ = potential difference between the plates in volts
$d$ = distance between plates 12 and 14 in meters.

This Equation 1 may be rearranged to the form $$V = gd\frac{m}{q}$$

Since $V$ and $d$ can be directly measured, and $g$ is known, it is necessary to obtain an independent value of $m$ or $q$ in order to solve for all variables in Equation 1.

The value of $m$ may be obtained from the measurement of droplet size. Larger droplets (e.g. 50 microns diameter and up) can be measured by dyeing the liquid and allowing the drops to fall on a piece of filter paper after the required balancing voltage is measured. The size of the spot on the filter paper is then measured under a microscope and the true droplet size read from a calibration curve of drop size vs. spot size. Sizes of smaller droplets are determined from time-of-fall measurements.

As noted above the electric field between plates 12 and 14 is reduced as the mass of droplet 40 decreases. After a period of say 30 seconds the droplet suddenly falls as if it had become very heavy. By quickly increasing the voltage, the forces can be balanced again and the droplet remains suspended. Evaporation again proceeds until the droplet falls again. This fall-evaporate sequence may occur as many as eight times with a single droplet. FIG. 2 illustrates a typical such situation.

From Equation 1 it is evident that a sudden fall implies a sudden decrease in $q/m$. What is actually observed when the droplet falls is the ejection of from one to around ten smaller droplets from the parent drop 40. The $q/m$ of these smaller droplets is always substantially higher than the original drop 40. Their size is very small—in the order of one to 15 microns. In general the larger the initial drop, the greater the number of ejected drops.

These phenomena show the development of surface electrical forces, during evaporation or volatilization of the droplets, which are sufficient to overcome surface tension forces and thereby cause the ejection of the smaller droplets. Accordingly, for any liquid droplet of a given size the surface tension controls the maximum potential gradient that can be achieved. This is found to be the case by a series of measurements of droplets of various liquids, under controlled operating conditions in the apparatus described above.

When a small particle is electrically charged by ordinary means, there is an upper limit to the charge which the particle can accept. This limit, which is well known, was defined by Ladenburg (Ann. Phys. 4, 5863 (1930)). By the procedure of the present invention, charged particles with charges far in excess of the maximum values hitherto attainable may be produced. For example, small water droplets which would have a maximum possible surface field of 30,000 v./cm. by conventional charging techniques may be given a field of 450,000 v./cm. by the procedure hereinabove described. Similar ranges of values are found in treating droplets of other liquids such as acetone, aniline, dioctylphthalate, isopropyl benzene, etc.

One way in which the process of this invention can be used is in the application of sprays, e.g. of insecticides. The spray may be delivered by any suitable spraying equipment adapted to provide the usual fine liquid droplets of spray, and also equipped with electrical charging apparatus which is adapted to charge the droplets as they are ejected from the spraying nozzle. The charging apparatus applies a high charge to the droplets, preferably near the maximum that they will accept as they leave the nozzle, and of a sign opposite to that of the object upon which they are to impinge. The droplets are of such size and volatility, and are applied at such a distance from the surfaces or objects which are being treated, that they evaporate sufficiently to provide them with charges in excess of those hitherto considered maximum (see Ladenburg, cited above). Preferably, in fact, these charges are sufficient to cause disruption, or repeated disruptions, of the droplets. The combined effect is to produce a spray of exceedingly finely subdivided particles which also, due to their charge, attach themselves quickly and strongly to the object being sprayed.

Many other uses, in both military and non-military fields, will occur to those skilled in the art.

We claim:

1. Method of imparting high charge density to volatile aerosol particles comprising the steps of discharging said particles from a source in the form of a spray, applying a high electric charge to said particles as they are discharged, and causing said particles to volatilize partially until the particle charge thereon is augmented to a point in excess of normal maximum charge for such particles and thereafter permitting said partially volatilized particles to strike a surface.

2. Method of imparting high charge density to volatile aerosol particles comprising the steps of discharging said particles from a source in the form of a spray, applying to said particles as they are discharged substantially the maximum electric charge which each of them is capable of receiving, projecting said particles through a distance toward an object to be treated, and delaying contact of said particles upon said object until partial volatilization of said particles during their travel toward said object occurs sufficiently to cause disruption of said particles due to the building up of charge thereon beyond said maximum charge.

3. Method of imparting high charge density to a volatile aerosol particle comprising the steps of imparting an initial electric charge to said particle, projecting said particle into an electric field in the presence of an atmosphere into which said particle can volatilize, causing volatilization of said particle in said atmosphere until the charge on said particle is augmented to beyond the normal maximum charge which each particle is capable of receiving, and varying said electric field to effect the positioning of said particle at a desired location within said field until charge augmentation occurs.

4. Method according to claim 3 wherein said volatilization is continued to the point where said particle is disrupted.

References Cited by the Examiner

UNITED STATES PATENTS

| | | | |
|---|---|---|---|
| 1,854,475 | 4/32 | Littlefield | 239—3 |
| 1,958,406 | 5/34 | Darrah | 118—629 |
| 2,302,289 | 11/42 | Bramston-Cook | 239—3 |
| 2,525,347 | 10/50 | Gilman | 239—3 |
| 2,894,175 | 7/59 | Lamm | 317—3 |
| 2,961,581 | 11/60 | Grave | 317—3 |
| 3,049,092 | 8/62 | Sedlacsik et al. | 239—3 |
| 3,060,429 | 10/62 | Winston | 118—627 |
| 3,122,320 | 2/64 | Beck et al. | 239—3 |

OTHER REFERENCES

"Physics," by Hausman and Slack, second edition, published by D. Van Nostrand Co., 1939, pages 346 and 347.

M. HENSON WOOD, JR., *Primary Examiner.*

EVERETT W. KIRBY, *Examiner.*